US012561023B2

(12) United States Patent
Kang et al.

(10) Patent No.:     US 12,561,023 B2
(45) Date of Patent:     Feb. 24, 2026

(54) TOUCH MODULE, DISPLAY DEVICE INCLUDING THE TOUCH MODULE, AND ELECTRONIC DEVICE INCLUDING THE DISPLAY DEVICE

(71) Applicant: Samsung Display Co., Ltd., Yongin-Si (KR)

(72) Inventors: Bongil Kang, Yongin-si (KR); Min-Hong Kim, Yongin-si (KR); Sangkook Kim, Yongin-si (KR); Taejoon Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/973,155

(22) Filed: Dec. 9, 2024

(65) Prior Publication Data

US 2025/0244844 A1      Jul. 31, 2025

(30) Foreign Application Priority Data

Jan. 29, 2024      (KR) ......................... 10-2024-0013334

(51) Int. Cl.
*G06F 3/041*          (2006.01)
*G06F 3/044*          (2006.01)
(52) U.S. Cl.
CPC ........ *G06F 3/04164* (2019.05); *G06F 3/0446* (2019.05)

(58) Field of Classification Search
None
See application file for complete search history.

(56) References Cited

U.S. PATENT DOCUMENTS

| | | | |
|---|---|---|---|
| 9,383,869 B1 * | 7/2016 | Polishchuk | ........... G06F 3/0443 |
| 11,775,105 B2 | 10/2023 | Kadowaki et al. | |
| 2015/0002752 A1 * | 1/2015 | Shepelev | .............. G06F 3/0412 |
| | | | 349/12 |
| 2015/0268778 A1 * | 9/2015 | Okamura | .............. G06F 3/0446 |
| | | | 345/173 |
| 2015/0355757 A1 * | 12/2015 | Hoch | .................... G06F 3/0448 |
| | | | 345/174 |
| 2021/0373711 A1 | 12/2021 | Smith et al. | |
| 2023/0100129 A1 | 3/2023 | Vaze et al. | |
| 2024/0111388 A1 * | 4/2024 | Gong | .................... G06F 3/0445 |

FOREIGN PATENT DOCUMENTS

JP          2023-033249 A        3/2023

* cited by examiner

*Primary Examiner* — Krishna P Neupane
(74) *Attorney, Agent, or Firm* — Innovation Counsel LLP

(57)                ABSTRACT

A touch module is provided which comprises a touch sensor including touch driving lines and touch sensing lines and a touch driver connected to the touch driving lines and the touch sensing lines to drive the touch sensor. Each of the touch sensing lines includes a first sub-sensing line disposed on a first side and a second sub-sensing line disposed on a second side opposite to the first side, and the first sub-sensing line is different from the second sub-sensing line.

21 Claims, 10 Drawing Sheets

TOUCH MODULE, DISPLAY DEVICE INCLUDING THE TOUCH MODULE, AND ELECTRONIC DEVICE INCLUDING THE DISPLAY DEVICE

This application claims priority under 35 USC § 119 to Korean Patent Application No. 10-2024-0013334 filed on Jan. 29, 2024 in the Korean Intellectual Property Office (KIPO), the entire disclosure of which is incorporated by reference herein.

BACKGROUND

1. Field

Embodiments of the present disclosure relate to a touch module and a display device including the touch module. More particularly, the present disclosure relates to a touch module, a display device including the touch module, and an electronic device including the display device that improves an accuracy of a touch sensing.

2. Description of the Related Art

A touch module is a device for recognizing an input action or an event by a user. The touch module includes a touch sensor and a touch driver for driving the touch sensor. The touch sensor may be mounted on one side of a display panel or may be formed within the display panel. Additionally, the touch sensor may include touch driving lines connected to driving channels and touch sensing lines connected to sensing channels.

When the touch sensor is touched by an input device which is a conductive object such as the user's a body and a stylus pen, the touch sensor may generate an electrical signal, and the touch driver may sense a presence and a position of the touch. Therefore, in order to improve an accuracy of the touch sensing, the electrical signal should be accurately obtained.

SUMMARY

Embodiments of the present disclosure provide a touch module that improves an accuracy of a touch sensing.

Embodiments of the present disclosure provide a display device including the touch module.

Embodiments of the present disclosure provide an electronic device including the display device.

In an embodiment of a touch module according to the present disclosure, the touch module comprises a touch sensor including touch driving lines and touch sensing lines and a touch driver connected to the touch driving lines and the touch sensing lines to drive the touch sensor. Each of the touch sensing lines includes a first sub-sensing line disposed on a first side and a second sub-sensing line disposed on a second side opposite to the first side, and the first sub-sensing line is different from the second sub-sensing line.

In an embodiment, the first sub-sensing line may have a structure different from the second sub-sensing line.

In an embodiment, the first sub-sensing line may include a first line and a second line at least partially surrounded by the first line.

In an embodiment, the second sub-sensing line may include the first line.

In an embodiment, a size of a capacitance formed by the first sub-sensing line and each of the touch driving lines disposed on the first side may be different from a size of a capacitance formed by the second sub-sensing line and each of the touch driving lines disposed on the second side.

In an embodiment, when the touch sensor is touched by an input device, the capacitance formed by the first sub-sensing line and each of the touch driving lines on the first side and the capacitance formed by the second sub-sensing line and each of the touch driving lines on the second side may change.

In an embodiment, a change amount of the capacitance formed by the first sub-sensing line and each of the touch driving lines on the first side may be different from a change amount of the capacitance formed by the second sub-sensing line and each of the touch driving lines on the second side.

In an embodiment, the touch driving lines may extend in a first direction, and the touch sensing lines may extend in a second direction different from the first direction.

In an embodiment, the first sub-sensing line and the second sub-sensing line may extend in the second direction.

In an embodiment, the first side and the second side may correspond to the second direction.

In an embodiment, at least two of the touch driving lines may be connected to one driving channel.

In an embodiment, the touch driver may be configured to generate a touch driving signal to provide the touch driving signal to the touch sensor, and receives a touch sensing signal from the touch sensor.

In an embodiment of a display device according to the present disclosure, the display device comprises a display module including a display panel including pixels and a display panel driver configured to drive the display panel and a touch module including a touch sensor disposed on the display panel and including touch driving lines and touch sensing lines, and a touch driver connected to the touch driving lines and the touch sensing lines to drive the touch sensor. Each of the touch sensing lines includes a first sub-sensing line disposed on a first side and a second sub-sensing line disposed on a second side opposite to the first side. The first sub-sensing line is different from the second sub-sensing line.

In an embodiment, the first sub-sensing line may have a structure different from the second sub-sensing line.

In an embodiment, the first sub-sensing line may include a first line and a second line at least partially surrounded by the first line.

In an embodiment, the second sub-sensing line may include the first line.

In an embodiment, a size of a capacitance formed by the first sub-sensing line and each of the touch driving lines disposed on the first side may be different from a size of a capacitance formed by the second sub-sensing line and each of the touch driving lines disposed on the second side.

In an embodiment, when the touch sensor is touched by an input device, the capacitance formed by the first sub-sensing line and each of the touch driving lines on the first side and the capacitance formed by the second sub-sensing line and each of the touch driving lines on the second side may change.

In an embodiment, a change amount of the capacitance formed by the first sub-sensing line and each of the touch driving lines on the first side may be different from a change amount of the capacitance formed by the second sub-sensing line and each of the touch driving lines on the second side.

In an embodiment, the touch driving lines may extend in a first direction, and the touch sensing lines may extend in a second direction different from the first direction.

In an embodiment of an electronic device according to the present disclosure, the electronic device comprises a display module including a display panel including pixels, a display panel driver configured to drive the display panel and a touch module including a touch sensor disposed on the display panel and including touch driving lines and touch sensing lines, and a touch driver connected to the touch driving lines and the touch sensing lines to drive the touch sensor, and a processor configured to control the display module and the touch module. Each of the touch sensing lines includes a first sub-sensing line disposed on a first side and a second sub-sensing line disposed on a second side opposite to the first side. The first sub-sensing line is different from the second sub-sensing line.

According to the touch module, the display device including the touch module, and the electronic device including the display device, each of the touch sensing lines may include the first sub-sensing line disposed on the first side and the second sub-sensing line disposed on the second side opposite to the first side, and the first sub-sensing line may be different from the second sub-sensing line. Accordingly, the accuracy of the touch sensing may be improved.

BRIEF DESCRIPTION OF THE DRAWINGS

The above and other features of embodiments of the present disclosure will become more apparent with reference to the descriptions below and the accompanying drawings.

DETAILED DESCRIPTION OF THE EMBODIMENTS

Hereinafter, the present disclosure will be described in more detail with reference to the accompanying drawings.

Figure 1:
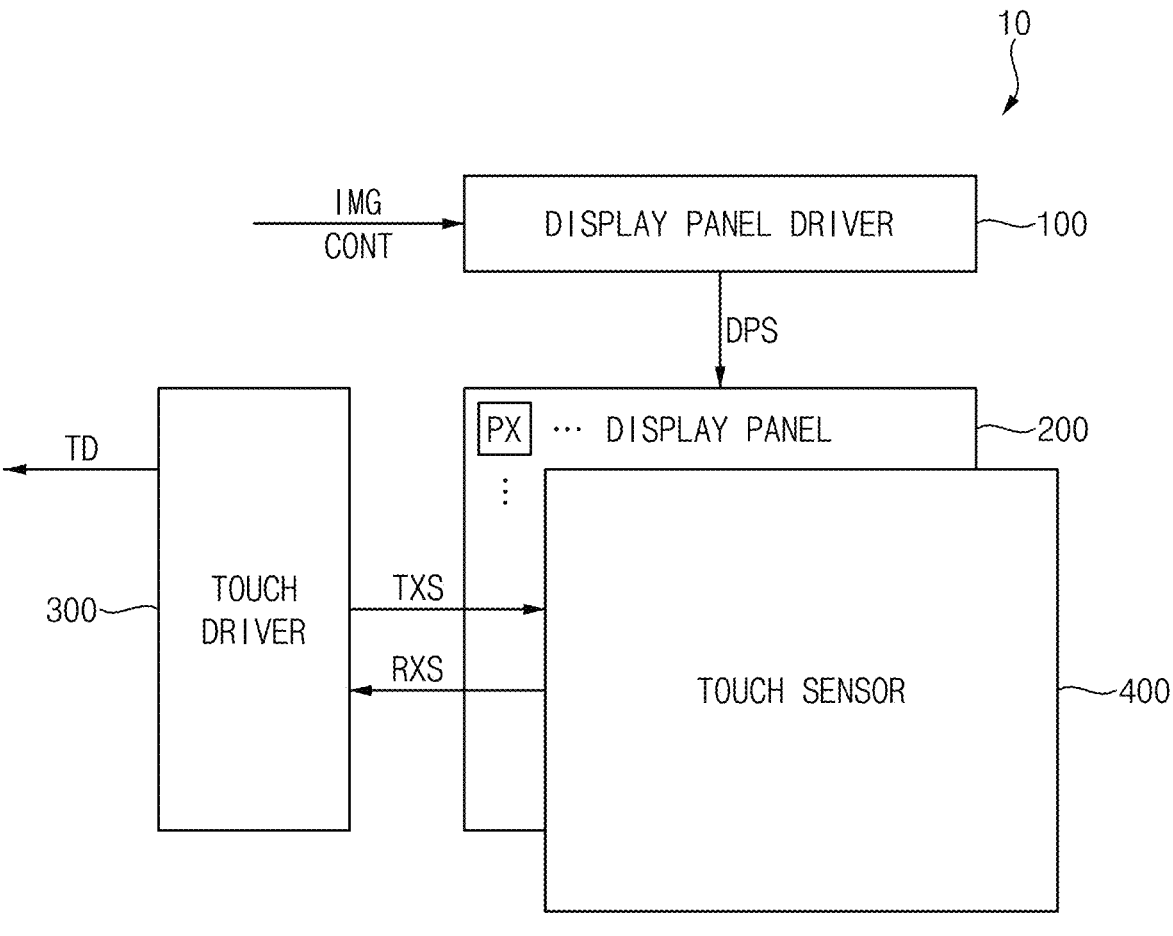
FIG. 1 is a block diagram illustrating a display device according to an embodiment of the present disclosure.
Figure 2:
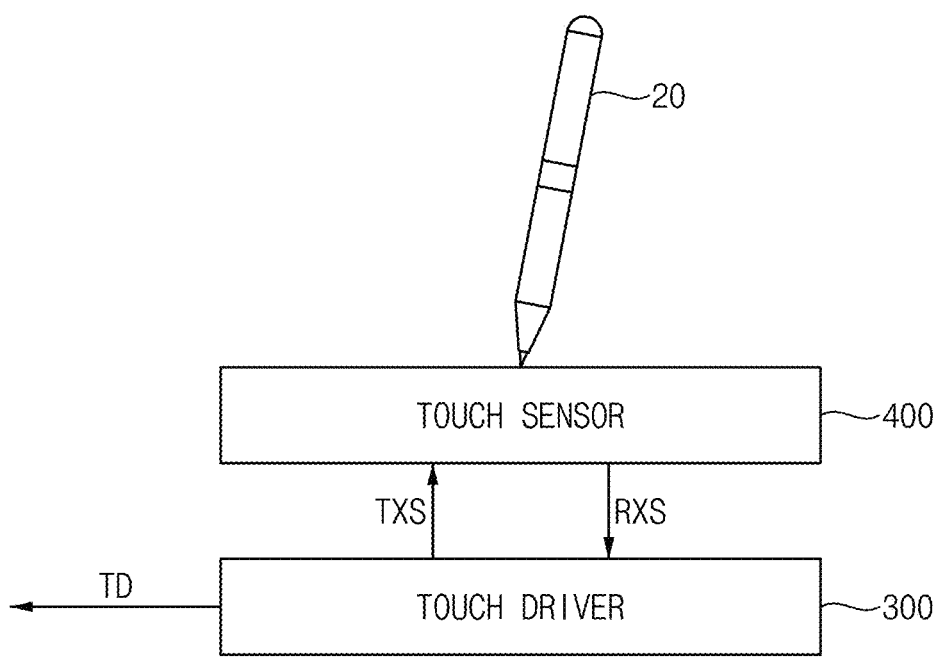
FIG. 2 is a diagram explaining an operation of a touch module of FIG. 1.

FIG. 1 is a block diagram illustrating a display device according to an embodiment of the present disclosure. FIG. 2 is a diagram explaining an operation of a touch module of FIG. 1.

Referring to FIGS. 1 and 2, a display device 10 may include a display module which displays an image and a touch module which recognizes an input action or a touch event by a user. The touch module may include a touch driver 300 and a touch sensor 400.

The display panel driver 100 may drive the display panel 200 to display an image. The display panel driver 100 may receive input image data IMG and an input control signal CONT from an external device (not shown). For example, the input image data IMG may include red image data, green image data and blue image data. The input image data IMG may include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal The display panel driver 100 may generate a display panel driving signal DPS based on the input image data IMG and the input control signal CONT, and provide the display panel driving signal DPS to the display panel 200. In an embodiment, the display panel driving signal DPS may include a gate signal and a data signal, and the display panel driver 100 may include a gate driver which provides the gate signal to the display panel 200, a data driver which provides the data signal to the display panel 200, and a driving controller for controlling the gate driver and the data driver.

The display panel 100 may include gate lines, data lines, pixels PX electrically connected to the gate lines and the data lines, respectively.

The touch driver 300 may drive the touch sensor 400 to sense a touch of an input device 20. The touch driver 300 may generate a touch driving signal TXS and provide the touch driving signal TXS to the touch sensor 400, and receive a touch sensing signal RXS from the touch sensor 400. The touch driver 300 may sense the touch of the input device 20 based on the touch sensing signal RXS. The touch driver 300 may generate touch data TD representing the sensed touch, and provide the touch data TD to the display panel driver 100 or the external device.

The touch sensor 400 may be a capacitance-type touch sensor detecting a capacitance change caused by the touch of the input device 20. For example, as shown in FIG. 2, the input device 20 may be a conductive object such as a user's a body or a stylus pen. The touch sensor 400 may be mounted on one side of the display panel 200 or be formed within the display panel 200. For example, the touch sensor 400 may be formed using an OCTA (On Cell Touch AMO-LED) method in which the touch sensor 400 is embedded in the display panel 200.

Figure 3:
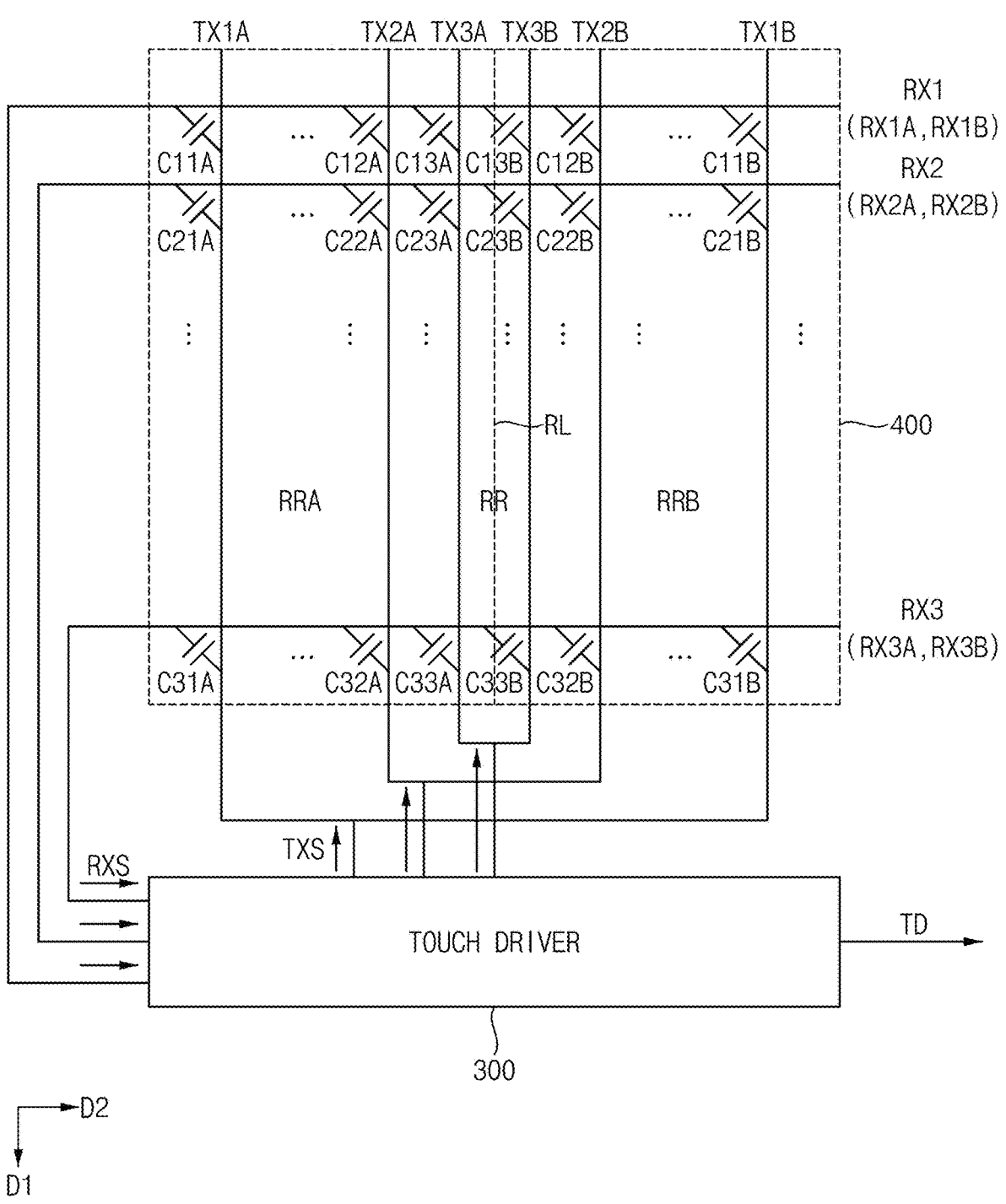
FIG. 3 is a diagram illustrating the touch module of FIG. 1.

FIG. 3 is a diagram illustrating the touch module of FIG. 1.

Referring to FIGS. 1 to 3, the touch sensor 400 may include touch driving lines TX1A to TX1B and touch sensing lines RX1 to RX3.

The touch driving lines TX1A to TX1B included in the touch sensor 400 may extend in a first direction D1, and the touch sensing lines RX1 to RX3 included in the touch sensor 400 may extend in a second direction D2 different from the first direction D1. In an embodiment, the second direction D2 may intersect the first direction D1.

The touch driving lines TX1A to TX1B may be connected to the touch driver 300 through driving channels (not shown), and the touch sensing lines RX1 to RX3 may be connected to the touch driver 300 through sensing channels (not shown). The touch driver 300 may provide the touch driving signals TXS to the touch driving lines TX1A to TX1B and receive the touch sensing signals RXS from the touch sensing lines RX1 to RX3.

In an embodiment, as shown in FIG. 3, at least two of the touch driving lines TX1A to TX1B may be connected to one driving channel. For example, any one of the touch driving lines TX1A, TX2A, TX3A disposed on a first side of a reference line RL and any one of the touch driving lines TX3B, TX2B, TX1B disposed on a second side of the reference line RL opposite to the first side of the reference line RL may be connected to the one driving channel. The first side and the second side may correspond to the second direction D2. Therefore, the touch driving lines connected to the one driving channel may receive a same touch driving signal TXS. For example, a first touch driving line TX1A on the first side and a first touch driving line TX1B on the second side may be connected to one driving channel and receive a same touch driving signal TXS. For example, a second touch driving line TX2A on the first side and a second touch driving line TX2B on the second side may be connected to one driving channel and receive a same touch driving signal TXS. For example, a third touch driving line TX3A on the first side and a third touch driving line TX3B on the second side may be connected to one driving channel and receive a same touch driving signal TXS. Each of driving channels connected to a different pair of touch driving lines, for example, connected to either a pair of TX1A and TX1B, a pair of TX2A and TX2B, or a pair of TX3A and TX3B, may apply different touch driving signals TXS. Thus, each pair of touch driving lines TX1A-TX1B, TX2A-TX2B, TX3A-TX3B may receive different touch driving signals TXS.

Figure 4:
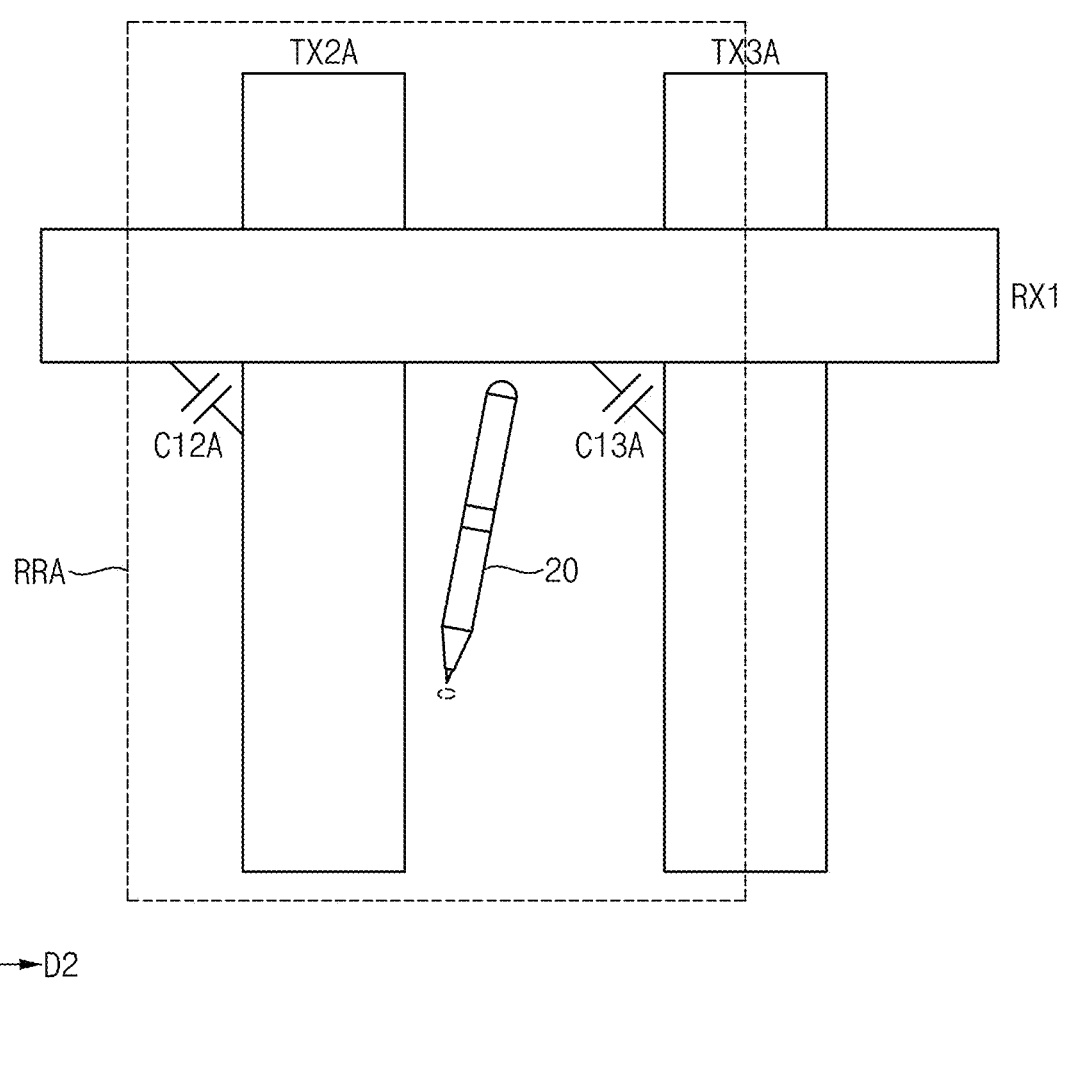
FIG. 4 is a diagram explaining an operation in which a touch sensor of FIG. 3 is touched as a dot by an input device in a first reference area or a second reference area.
Figure 5:
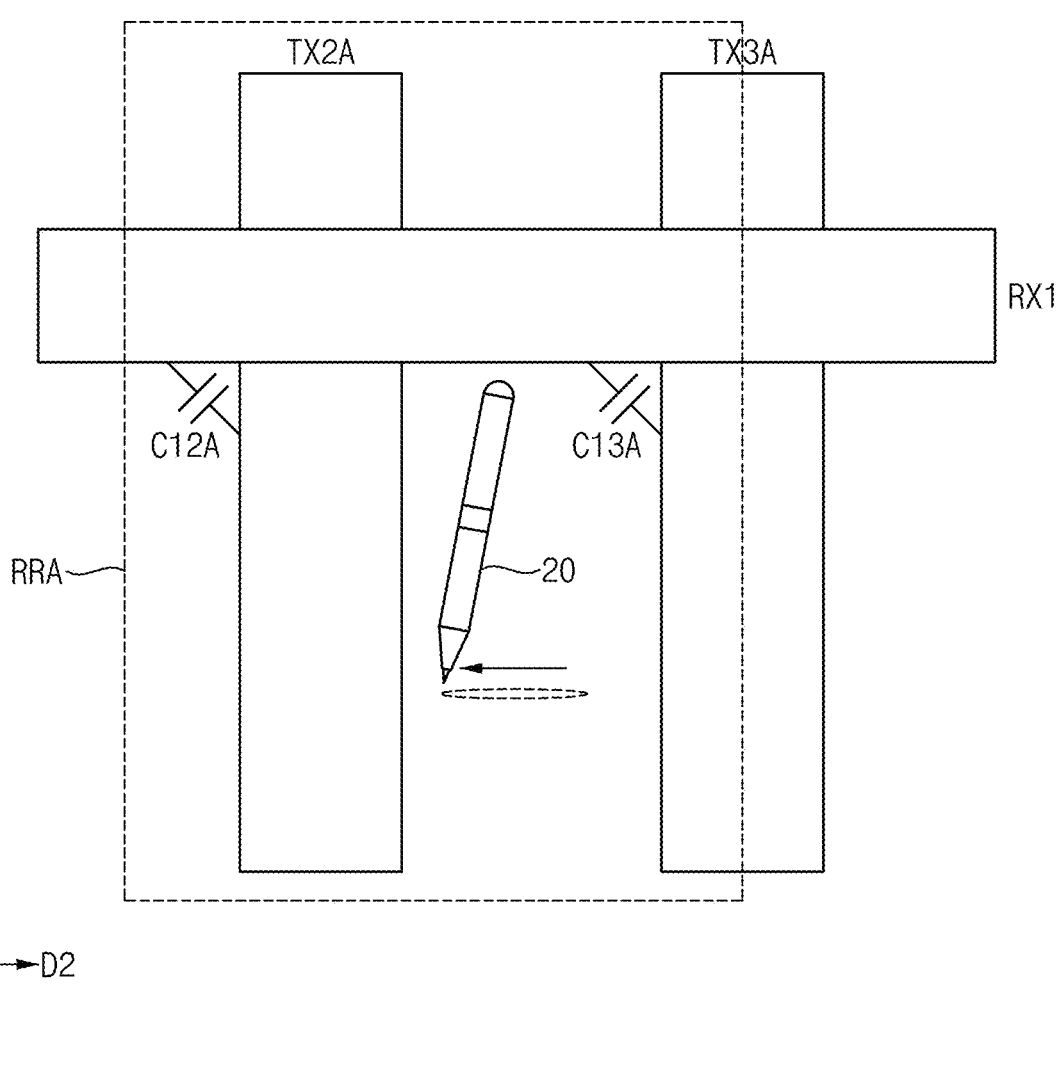
FIG. 5 is a diagram explaining an operation in which a touch sensor of FIG. 3 is touched as a line by an input device in a first reference area or a second reference area.

Capacitances C11A to C31B may be formed by the touch driving lines TX1A to TX1B and the touch sensing lines RX1 to RX3. A position where the capacitances C11A to C31B are formed may be a position where the touch driving lines TX1A to TX1B and the touch sensing lines RX1 to RX3 overlap. For example, capacitance C11A may be formed by the first touch driving line TX1A and the first touch sensing line RX1 on the first side. For example, capacitance C21A may be formed by the first touch driving line TX1A and the second touch sensing line RX2 on the first side. For example, capacitance C31A may be formed by the first touch driving line TX1A and the third touch sensing line RX3 on the first side. In FIGS. 3 to 5, for a convenience of illustration, C11A to C31B are shown at positions different from where the touch driving lines TX1A to TX1B and the touch sensing lines RX1 to RX3 overlap.

A reference area RR, a first reference area RRA, and a second reference area RRB may be defined by the third touch driving line TX3A on the first side and the third touch driving line TX3B on the second side. The third touch driving line TX3A on the first side and the third touch driving line TX3B on the second side may be touch driving lines closest to the reference line RL. The reference area RR may be an area between the third touch driving line TX3A on the first side and the third touch driving line TX3B on the second side among an area of the touch sensor 400. The first reference area RRA may be an area positioned on a first side of the reference area RR among the area of the touch sensor 400. The second reference area RRB may be an area positioned on a second side of the reference area RR among the area of the touch sensor 400.

When the touch sensor 400 is touched by the input device 20, the touch driver 300 may sense a change of the capacitances C11A to C31B, and the touch of the input device 20 may be sensed based on the change of the capacitances C11A to C31B.

Each of the touch sensing lines RX1, RX2, RX3 may include a first sub-sensing line RX1A, RX2A, RX3A disposed on the first side and a second sub-sensing line RX1B, RX2B, RX3B disposed on the second side.

FIG. 4 is a diagram explaining an operation in which a touch sensor of FIG. 3 is touched as a dot by an input device in a first reference area or a second reference area. FIG. 5 is a diagram explaining an operation in which a touch sensor of FIG. 3 is touched as a line by an input device in a first reference area or a second reference area.

Referring to FIGS. 1 to 5, the touch sensor 400 may be touched as a dot by the input device 20.

For example, as shown in FIG. 4, the touch sensor 400 may be touched by the input device 20 as the point in the first reference area RRA or the second reference area RRB. In this case, the capacitances C11A to C31B may change only at a touch moment. The touch driver 300 may sense the touch of the input device 20 as the dot based on the change in the capacitances C11A to C31B.

The touch sensor 400 may be touched as a line by the input device 20.

For example, as shown in FIG. 5, the touch sensor 400 may be touched by the input device 20 as the line in the first reference area RRA or the second reference area RRB. A size of the capacitances C11A to C31B may vary depending on a position. Touch driving lines TX1A, TX2A, TX3A disposed in the first reference area RRA may be connected to different driving channels, and touch driving lines TX3B, TX2B1 TX1B disposed in the second reference area RRB may be connected to different driving channels. Therefore, a size of capacitances C11A to C33A formed in the first reference area RRA may be different from each other, and a sizes of capacitances C11B to C33B formed in the second reference area RRB may be different from each other. For example, a size of C13A and C12A may be different, and a size of C12A and C11A may be different. Therefore, capacitances C12A, C13A having different sizes adjacent to a touch position of the input device 20 may change for a certain period of time, and a change amount of each of the capacitances C12A, C13A may vary depending on a movement of the input device 20. Accordingly, the touch driver 300 may sense the touch of the input device 20 as the line.

Figure 6:
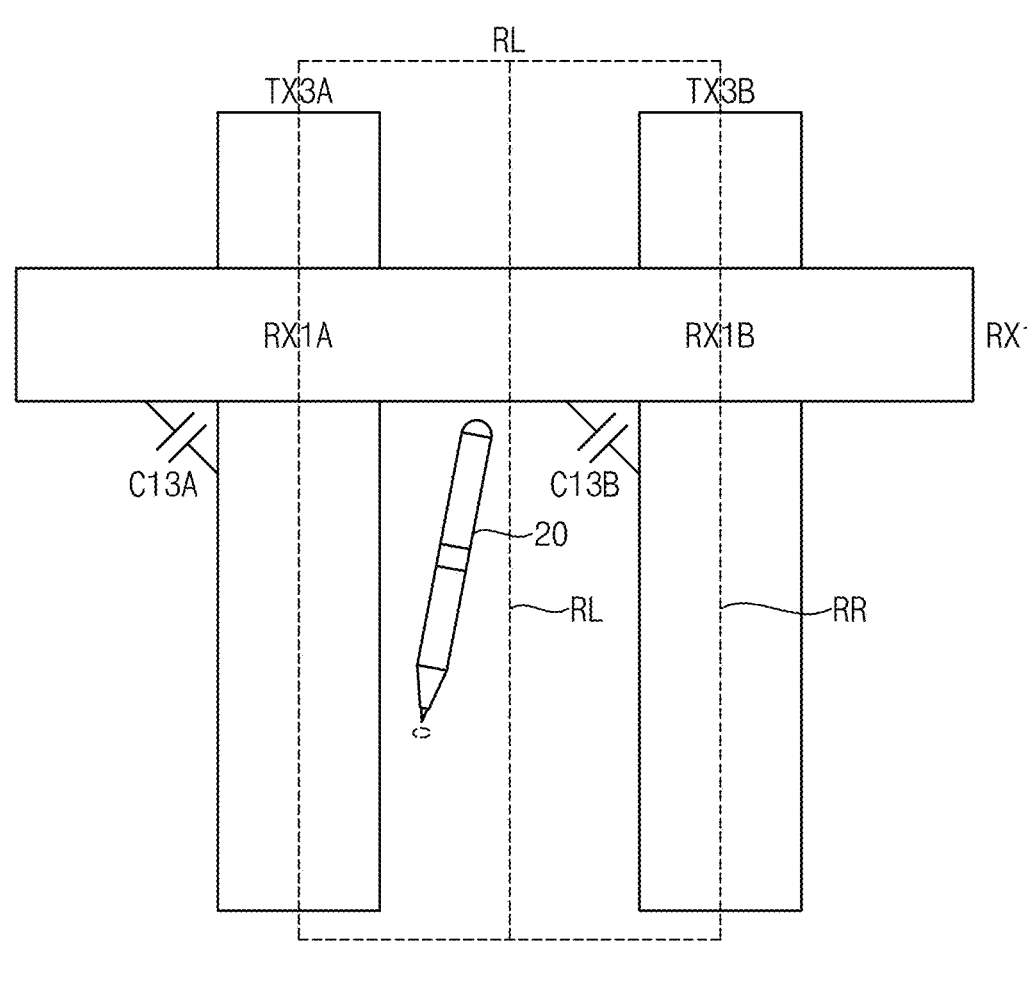
FIG. 6 is a diagram explaining an operation in which a touch sensor of FIG. 3 is touched as a dot by an input device in a reference area.
Figure 6:
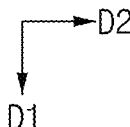
Figure 7:
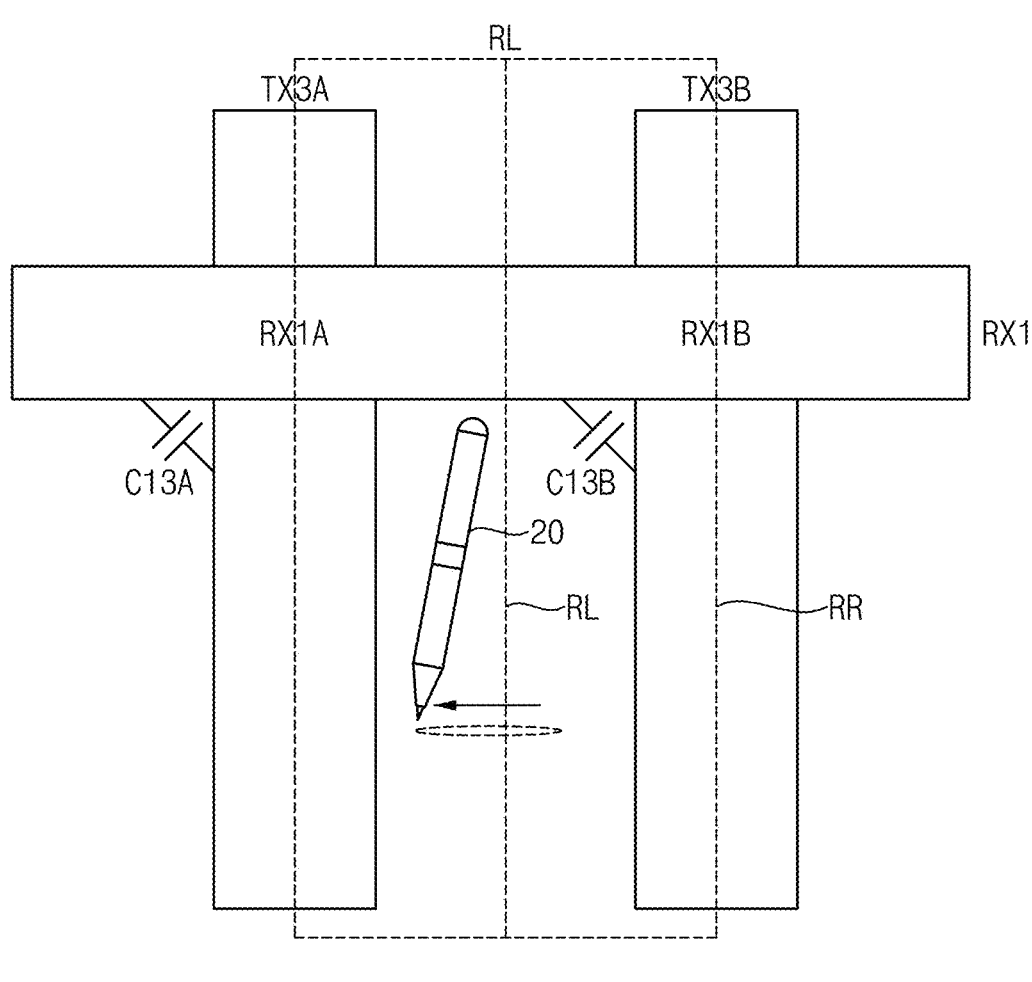
FIG. 7 is a diagram explaining an operation in which a touch sensor of FIG. 3 is touched as a line by an input device in a reference area.

FIG. 6 is a diagram explaining an operation in which a touch sensor of FIG. 3 is touched as a dot by an input device in a reference area. FIG. 7 is a diagram explaining an operation in which a touch sensor of FIG. 3 is touched as a line by an input device in a reference area.

Referring to FIGS. 6 and 7, the touch sensor 400 may be touched as the dot or the line by the input device 20 in the reference region RR.

Since touch driving lines TX3A, TX3B disposed in the reference area RR are connected to the one driving channel, capacitances C13A, C13B formed by the touch driving lines TX3A, TX3B disposed in the reference area RR and the touch sensing line RX1 may be equal to each other. Likewise, a size of capacitances C23A and C23B may be the same as each other, and a size of capacitances C33A and C33B may be the same as each other.

Therefore, when the touch sensor 400 is touched as the point by the input device 20 in the reference region RR, capacitances C13A, C13B, having a same size adjacent to a touch position of the input device 20, may change incorrectly at the touch moment. The touch driver 300 may inaccurately sense the touch of the input device 20 as the dot.

In addition, when the touch sensor 400 is touched by the input device 20 in the reference region RR as the line (particularly in the second direction D2), the capacitances C13A, C13B having the same size adjacent to the touch position of the input device 20 may change for a certain period of time, and a change amount of each of the capacitances C13A, C13B may be the same despite the movement of the input device 20. The touch driver 300 may inaccurately sense the touch of the input device 20 as the line.

As such, when at least two of the touch driving lines TX1A to TX1B are connected to the one driving channel and the touch sensor 400 is touched as the dot or line by the input device 20 in the reference region RR, the touch driver 300 may incorrectly sense the touch of the input device 20.

According to touch driving lines TX1A to TX1B of a touch sensor 400 according to an embodiment of the present disclosure, in the reference region RR, capacitances C13A, C23A, C33A on the first side are different from capacitances C13B, C23B, C33B on the second side. Therefore, the touch driver 300 may accurately sense the touch of the input device 20 as the dot or the line in the reference region RR. This will be described in detail later in FIGS. 8 and 9.

Figure 8:
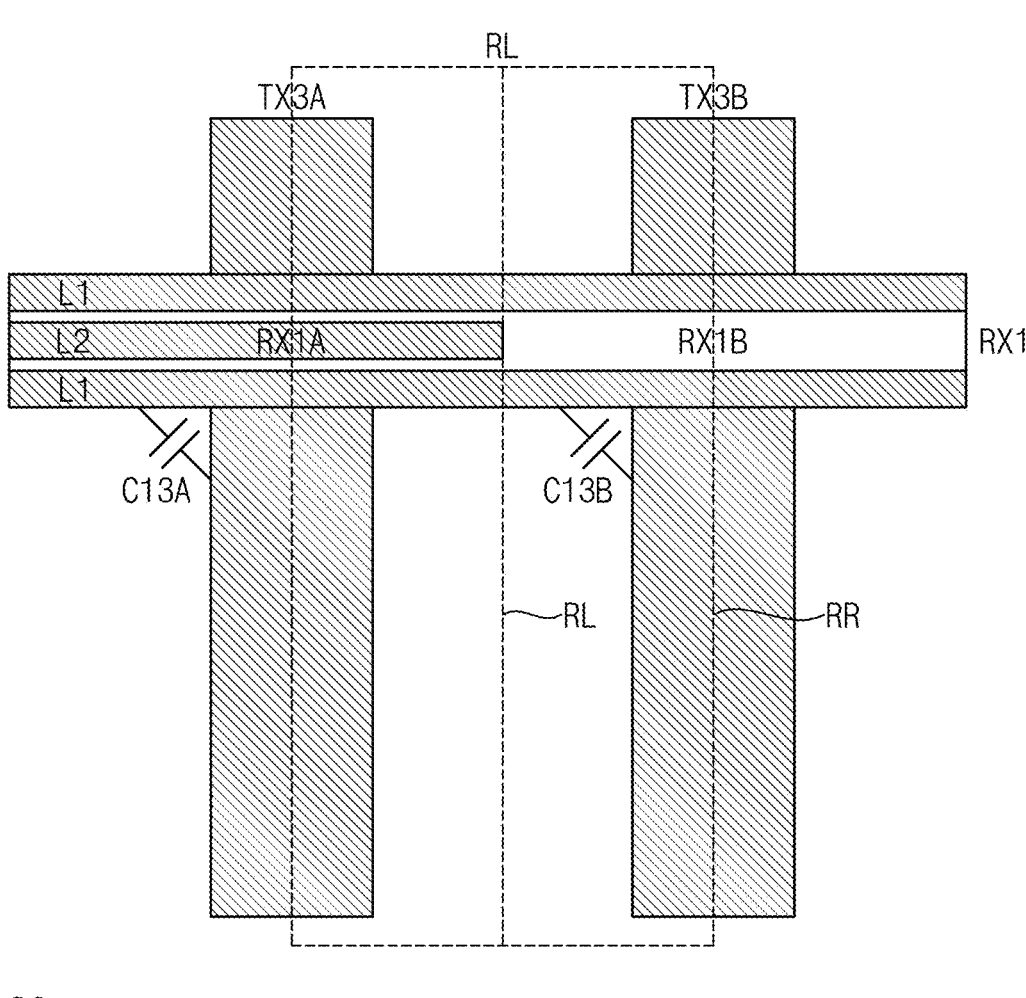
FIG. 8 and FIG. 9 are diagrams illustrating touch driving lines and touch sensing lines of a touch sensor according to an embodiment of the present disclosure.
Figure 8:
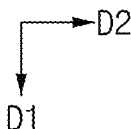
Figure 9:
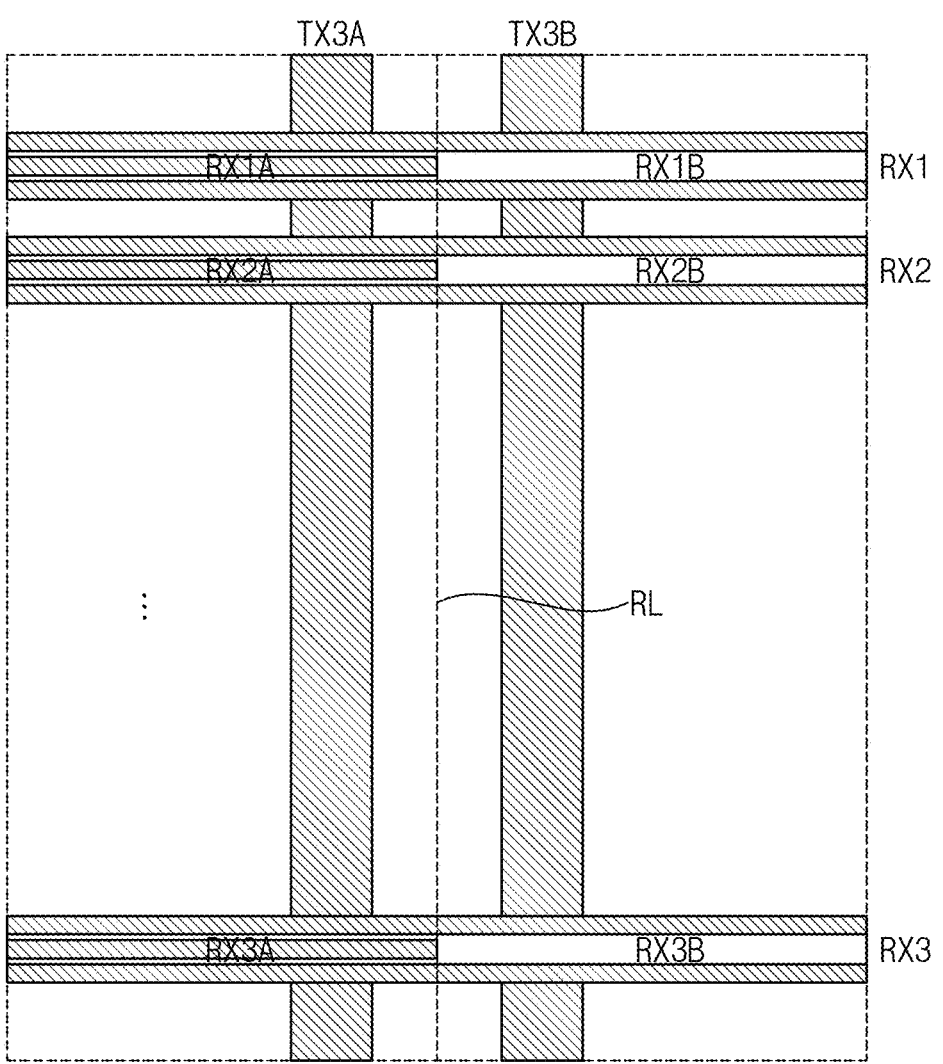
Figure 9:
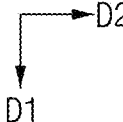

FIGS. 8 and 9 are diagrams illustrating touch driving lines and touch sensing lines of a touch sensor according to an embodiment of the present disclosure.

Referring to FIGS. 1 to 9, each of the touch sensing lines RX1, RX2, RX3 may include the first sub-sensing lines RX1A, RX2A, RX3A disposed on the first side of the reference line RL and the second sub-sensing lines RX1B, RX2B, RX3B disposed on the second side of the reference line RL, and the first sub-sensing lines RX1A, RX2A, RX3A may be different from the second sub-sensing lines RX1B, RX2B, RX3B. In an embodiment, the first sub-sensing lines RX1A, RX2A, RX3A may have a structure different from the second sub-sensing lines RX1B, RX2B, RX3B. For example, the first sub-sensing lines RX1A, RX2A, RX3A may include a first line L1 and a second line L2 which is at least partially surrounded by the first line L1, and the second sub-sensing lines RX1B, RX2B, RX3B may include the first line L1. That is, the first sub-sensing lines RX1A, RX2A, RX3A may further include the second line L2 compared to the second sub-sensing lines RX1B, RX2B, RX3B.

As the first sub-sensing lines RX1A, RX2A, RX3A include the first line L1 and the second line L2, and the second sub-sensing lines RX1B, RX2B, RX3B include only the first line L1, a size of capacitances C11A to C33A formed by the first sub-sensing lines RX1A, RX2A, RX3A and the touch driving lines TX1A, TX2A, TX3A is different from a size of capacitances C11B to C33B formed by the second sub-sensing line RX1B, RX2B, RX3B and the touch driving line TX3B, TX2B, and TX1B. In particular, in the reference region RR, the capacitances C13A, C23A, C33A on the first side may be different from the capacitances C13B, C23B, C33B on the second side. For example, as shown in FIG. 8, in the reference area RR, a size of capacitance C13A formed by the first sub-sensing line RX1A of the first touch sensing line RX1 and the third touch driving line TX3A on the first side may be different from a size of capacitance C13B formed by the second sub-sensing line RX1B of the first touch sensing line RX1 and the third touch driving line TX3B on the second side.

Therefore, even if the touch sensor 400 is touched by the input device 20 in the reference area RR, capacitance C13A, C23A, C33A formed by the first sub-sensing line RX1A, RX2A, RX3A and the third touch driving line TX3A on the first side and capacitance C13B, C23B, C33B formed the second sub-sensing line RX1B, RX2B, RX3B and the third touch driving line TX3B on the second side may accurately change. Accordingly, the touch driver 300 may accurately sense the touch of the input device 20 as the dot in the reference region RR.

As the size of the capacitance C13A formed by the first sub-sensing line RX1A of the first touch sensing line RX1 and the third touch driving line TX3A on the first side may be different from the size of the capacitance C13B formed by the second sub-sensing line RX1B of the first touch sensing line RX1 and the third touch driving line TX3B on the second side, a change of the capacitance C13A formed by the first sub-sensing line RX1A of the first touch sensing line RX1 and the third touch driving line TX3A on the first side may be different from a change of the capacitance C13B formed by the second sub-sensing line RX1B of the first touch sensing line RX1 and the third touch driving line TX3B on the second side. Accordingly, the touch driver 300 may accurately sense the touch of the input device 20 as the line in the reference region RR.

As such, even if at least two of the touch driving lines TX1A to TX1B are connected to the one driving channel and the touch sensor 400 is touched as the dot or the line by the input device 20 in the reference region RR, the first sub-sensing line RX1A, RX2A, RX3A may be different from the second sub-sensing line RX1B, RX2B, RX3B, such that the touch driver 300 may accurately sense the touch of the input device 20 as the dot or the line in the reference region RR.

Figure 10:
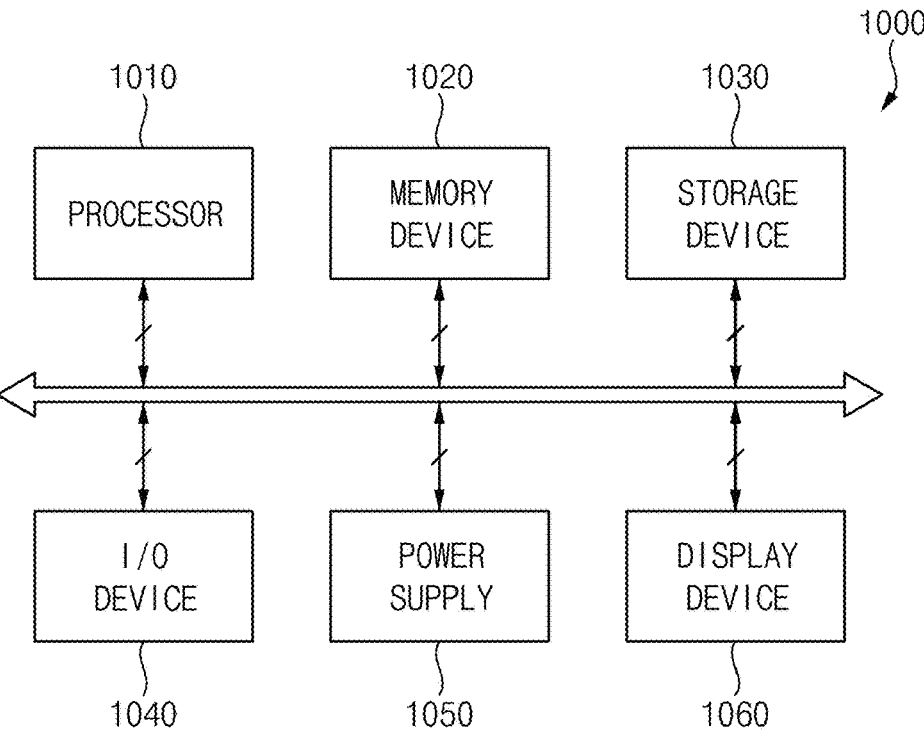
FIG. 10 is a block diagram illustrating an electronic device.
Figure 11:
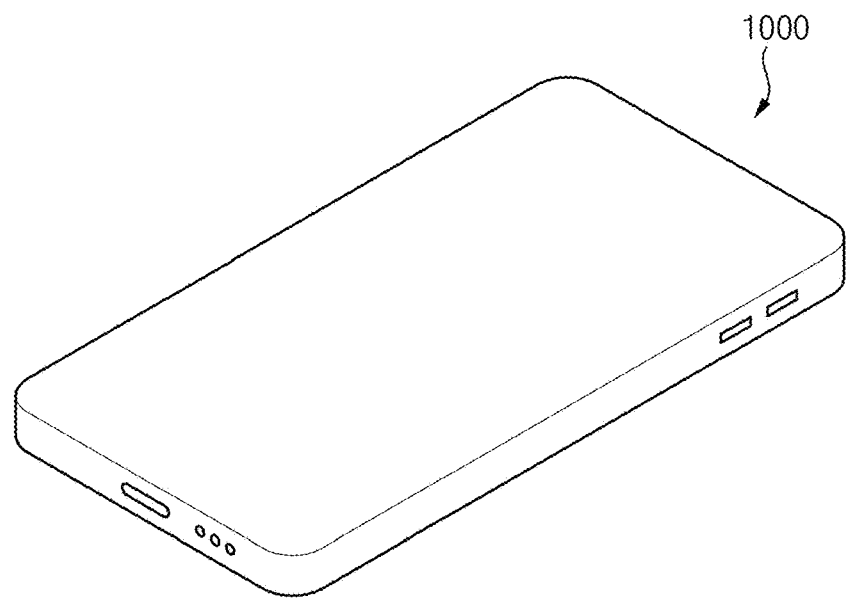
FIG. 11 is a diagram illustrating an embodiment in which the electronic device of FIG. 10 is implemented as a smart phone.

FIG. 10 is a block diagram illustrating an electronic device. FIG. 11 is a diagram illustrating an embodiment in which the electronic device of FIG. 10 is implemented as a smart phone.

Referring to FIGS. 10 and 11, the electronic device 1000 may include a processor 1010, a memory device 1020, a storage device 1030, an input/output (I/O) device 1040, a power supply 1050, and a display device 1060. The display device 1060 may be the display device 10 of FIG. 1. In addition, the electronic device 1000 may further include a plurality of ports for communicating with a video card, a sound card, a memory card, a universal serial bus (USB) device, other electronic device, and the like.

In an embodiment, as illustrated in FIG. 11, the electronic device 1000 may be implemented as the smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions. The processor 1010 may be a microprocessor, a central processing unit (CPU), an application processor (AP), and the like. The processor 1010 may be coupled to other components via an address bus, a control bus, a data bus, and the like. Further, the processor 1010 may be coupled to an extended bus such as a peripheral component interconnection (PCI) bus.

The memory device 1020 may store data for operating the electronic device 1000. For example, the memory device 1020 may include at least one nonvolatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like.

The I/O device 1040 may include an input device such as a keyboard, a keypad, a mouse device, a touch-pad, a touch-screen, and the like, and an output device such as a printer, a speaker, and the like. In some embodiments, the I/O device 1040 may include the display device 1060.

The power supply 1050 may provide power for operating the electronic device 1000.

The display device 1060 may be connected to other components through buses or other communication links.

The present disclosure may be applied to any display device and any electronic device including the touch panel. For example, the present disclosure may be applied to a mobile phone, a smart phone, a tablet computer, a digital television (TV), a 3D TV, a personal computer (PC), a home appliance, a laptop computer, a personal digital assistant (PDA), a portable multimedia player (PMP), a digital camera, a music player, a portable game console, a navigation device, etc.

The foregoing is illustrative of the inventive concept and is not to be construed as limiting thereof. Although a few embodiments of the inventive concept have been described, those skilled in the art will readily appreciate that many modifications are possible in the embodiments without materially departing from the novel teachings and advantages of the present disclosure. Accordingly, all such modifications are intended to be included within the scope of the present disclosure as defined in the claims. In the claims, means-plus-function clauses are intended to cover the structures described herein as performing the recited function and not only structural equivalents but also equivalent structures. Therefore, it is to be understood that the foregoing is illustrative of the present disclosure and is not to be construed as limited to the specific embodiments disclosed, and that modifications to the disclosed embodiments, as well as other embodiments, are intended to be included within the scope of the appended claims. The scope of the present disclosure is defined by the following claims encompassing equivalents thereof.

What is claimed is:

1. A touch module, comprising:
a touch sensor including touch driving lines and touch sensing lines; and
a touch driver connected to the touch driving lines and the touch sensing lines to drive the touch sensor,
wherein each of the touch sensing lines includes a first sub-sensing line disposed on a first side and a second sub-sensing line disposed on a second side opposite to the first side,
wherein the first sub-sensing line is different from the second sub-sensing line,
wherein first touch driving lines sharing one driving channel are disposed symmetrically on the first and second sides based on a reference line in the touch sensor,
wherein the first sub-sensing line is disposed on the first side based on the reference line, and the second sub-sensing line is disposed on the second side based on the reference line, and
wherein the first sub-sensing line and the second sub-sensing line are connected.

2. The touch module of claim 1, wherein the first sub-sensing line has a structure different from the second sub-sensing line.

3. The touch module of claim 2, wherein the first sub-sensing line includes a first line and a second line at least partially surrounded by the first line.

4. The touch module of claim 3, wherein the second sub-sensing line includes the first line.

5. The touch module of claim 1, wherein a size of a capacitance formed by the first sub-sensing line and each of the touch driving lines disposed on the first side is different from a size of a capacitance formed by the second sub-sensing line and each of the touch driving lines disposed on the second side.

6. The touch module of claim 5, wherein, when the touch sensor is touched by an input device, the capacitance formed by the first sub-sensing line and each of the touch driving lines on the first side and the capacitance formed by the second sub-sensing line and each of the touch driving lines on the second side change.

7. The touch module of claim 5, wherein a change amount of the capacitance formed by the first sub-sensing line and each of the touch driving lines on the first side is different from a change amount of the capacitance formed by the second sub-sensing line and each of the touch driving lines on the second side.

8. The touch module of claim 1, wherein the touch driving lines extend in a first direction, and the touch sensing lines extend in a second direction different from the first direction.

9. The touch module of claim 8, wherein the first sub-sensing line and the second sub-sensing line extend in the second direction.

10. The touch module of claim 8, wherein the first side and the second side correspond to the second direction.

11. The touch module of claim 1, wherein at least two of the touch driving lines are connected to the one driving channel.

12. The touch module of claim 1, wherein the touch driver is configured to generate a touch driving signal to provide the touch driving signal to the touch sensor, and receives a touch sensing signal from the touch sensor.

13. A display device, comprising:
a display module including a display panel including pixels and a display panel driver configured to drive the display panel; and
a touch module including a touch sensor disposed on the display panel and including touch driving lines and touch sensing lines, and a touch driver connected to the touch driving lines and the touch sensing lines to drive the touch sensor,
wherein each of the touch sensing lines includes a first sub-sensing line disposed on a first side and a second sub-sensing line disposed on a second side opposite to the first side,
wherein the first sub-sensing line is different from the second sub-sensing line,
wherein first touch driving lines sharing one driving channel are disposed symmetrically on the first and second sides based on a reference line in the touch sensor,
wherein the first sub-sensing line is disposed on the first side based on the reference line, and the second sub-sensing line is disposed on the second side based on the reference line, and
wherein the first sub-sensing line and the second sub-sensing line are connected.

14. The display device of claim 13, wherein the first sub-sensing line has a structure different from the second sub-sensing line.

15. The display device of claim 14, wherein the first sub-sensing line includes a first line and a second line at least partially surrounded by the first line.

16. The display device of claim 15, wherein the second sub-sensing line includes the first line.

17. The display device of claim 13, wherein a size of a capacitance formed by the first sub-sensing line and each of the touch driving lines disposed on the first side is different from a size of a capacitance formed by the second sub-sensing line and each of the touch driving lines disposed on the second side.

18. The display device of claim 17, wherein, when the touch sensor is touched by an input device, the capacitance formed by the first sub-sensing line and each of the touch driving lines on the first side and the capacitance formed by the second sub-sensing line and each of the touch driving lines on the second side change.

19. The display device of claim 17, wherein a change amount of the capacitance formed by the first sub-sensing line and each of the touch driving lines on the first side is different from a change amount of the capacitance formed by the second sub-sensing line and each of the touch driving lines on the second side.

20. The display device of claim 13, wherein the touch driving lines extend in a first direction, and the touch sensing lines extend in a second direction different from the first direction.

21. An electronic device, comprising:
a display module including a display panel including pixels and a display panel driver configured to drive the display panel;
a touch module including a touch sensor disposed on the display panel and including touch driving lines and touch sensing lines, and a touch driver connected to the touch driving lines and the touch sensing lines to drive the touch sensor; and
a processor configured to control the display module and the touch module,
wherein each of the touch sensing lines includes a first sub-sensing line disposed on a first side and a second sub-sensing line disposed on a second side opposite to the first side,
wherein the first sub-sensing line is different from the second sub-sensing line,
wherein first touch driving lines sharing one driving channel are disposed symmetrically on the first and second sides based on a reference line in the touch sensor,
wherein the first sub-sensing line is disposed on the first side based on the reference line, and the second sub-sensing line is disposed on the second side based on the reference line, and
wherein the first sub-sensing line and the second sub-sensing line are connected.

* * * * *